United States Patent [19]
Haas et al.

[11] 3,779,751
[45] Dec. 18, 1973

[54] LIQUID CRYSTALLINE COMPOSITIONS

[75] Inventors: Werner E. L. Haas; John B. Flannery, Jr., both of Webster; Bela Mechlowitz, Rochester; James E. Adams, Ontario, all of N.Y.

[73] Assignee: Xerox Corporation, Stamford, Conn.

[22] Filed: Sept. 13, 1971

[21] Appl. No.: 180,019

[52] U.S. Cl. ............... 96/1 E, 252/408, 350/160 LC
[51] Int. Cl. ....... G03g 5/00, G01n 31/00, G02f 1/78
[58] Field of Search ................... 252/408; 96/1, 1.5; 350/160

[56] References Cited
UNITED STATES PATENTS

| | | | |
|---|---|---|---|
| 3,689,525 | 9/1972 | Scheurle et al. | 260/473 R |
| 3,597,044 | 4/1971 | Castellano | 350/160 LC |
| 3,625,591 | 12/1971 | Freiser | 350/160 LC |
| 3,627,408 | 12/1971 | Ferguson | 353/84 |

FOREIGN PATENTS OR APPLICATIONS

| | | | |
|---|---|---|---|
| 1,170,486 | 11/1969 | Great Britain | 252/408 |

OTHER PUBLICATIONS

Liquid Crystals Draw Intense Interest, C & EN, Nov. 1, 1971, pp. 20–23.

Kelker et al., A Liquid–Crystalline (Nematic) Phase with a Particularly Low Solidification Point, Angew, Chem. Internat. Edit., Vol. 8, No. 11, pp. 884–885, (1969).

V. A. Usol'Tseva et al., Chemical Characteristics, Structure and Properties of Liquid Crystal Russian Chemical Reviews, Vol. 32, No. 9, Sept., 1963, pp. 495–507.

*Primary Examiner*—George F. Lesmes
*Assistant Examiner*—M. B. Wittenberg
*Attorney*—James J. Ralabate et al.

[57] ABSTRACT

Liquid crystalline compositions having a cholesteric mesophase are disclosed. The compositions have extended mesomorphic ranges and are stable at relatively low temperatures. Uses of the novel compositions in various electro-optic applications are also disclosed.

10 Claims, 10 Drawing Figures

INVENTORS.
JOHN B. FLANNERY JR.
WERNER E. L. HAAS
JAMES E. ADAMS
BELA MECHLOWITZ

BY J. D. Maccarone

ATTORNEY

LIQUID CRYSTALLINE COMPOSITIONS

BACKGROUND OF THE INVENTION

This application relates to liquid crystalline compositions and more particularly to optically negative liquid crystalline compositions which have extended mesomorphic temperature ranges and which are stable at relatively low temperatures.

Liquid crystalline substances exhibit physical characteristics some of which are typically associated with liquids and others which are typically unique to solid crystals. The name "liquid crystals" has become generic to substances exhibiting these dual properties. Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a manner which is unique to each of the three mesomorphic structures. Each of these three structures is well known in the liquid crystal art.

Some liquid crystalline substances possess optically negative characteristics. Birefringence, also referred to as double refraction, is an optical phenomenon characteristic of some solid crystals and most liquid crystal substances. When a beam of unpolarized light strikes a birefringent substance it is split into two polarized components whose transverse vibrations are at right angles to each other. The two components are transmitted at different velocities through the substance and emerge as beams of polarized light. By the term "optically negative liquid crystalline substances," as used herein, is meant those for which the extra-ordinary index of refraction $\eta_E$ is smaller than the ordinary index of refraction $\eta_o$. Cholesteric liquid crystal substances exhibit this property. For a detailed description of this phenomenon see *Optical Crystallography*, Wahlstrom, fourth Edition, Wiley and Sons, Inc., New York.

The molecules in cholesteric liquid crystals are arranged in very thin layers with the long axes of the molecules parallel to each other and to the plane of the layers within each layer. Because of the asymmetry and steric nature of the molecules the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in "Molecular Structure and the Properties of Liquid Crystals," G. W. Gray, Academic Press 1962.

Cholesteric liquid crystals have the property that when the propagation direction of plane polarized or unpolarized light is along the helical axis thereof, i.e., when the light enters in a direction perpendicular to the long axes of the molecules, (neglecting absorption considerations), this light is essentially unaffected in transmission through thin films of such liquid crystals except for a wavelength band centered about some wavelength $\lambda_o$ where $\lambda_o = 2np$ with $n$ representing the index of refraction of the liquid crystal substance and $p$ the pitch or repetition distance of the helical structure. The bandwidth $\Delta\lambda_o$ of this wavelength band centered about $\lambda_o$ will typically be of the order of about $(\lambda_o/14)$. For light of a wavelength $\lambda_o$, the cholesteric liquid crystal, under these conditions, exhibits selective reflection of the light such that approximately 50 percent of the light is reflected and approximately 50 percent is transmitted, assuming negligible absorption which is usually the case, with both the reflected and transmitted beams being approximately circularly polarized in opposite directions.

For light having wavelengths around $\lambda_o$ but not at $\lambda_o$ the same effect is present but not as pronounced. The transmitted light is not circularly polarized but is instead elliptically polarized. The chlolesteric liquid crystals which exhibit this property of selective reflection of light in a region centered around some wavelength $\lambda_o$ are said to be in the Grandjean or "disturbed" texture. If $\lambda_o$ is in the visible spectrum the liquid crystalline film appears to have the color corresponding to $\lambda_o$ and if $\lambda_o$ is outside the visible spectrum the film appears colorless.

Depending upon the intrinsic rotary sense of the helix, i.e., whether it is right-handed or left-handed, the light that is transmitted in the region about $\lambda_o$ is either right-hand circularly polarized light (RHCPL) or left-hand circularly polarized light (LHCPL). The transmitted light is circularly polarized with the same sense of polarization as that intrinsic to the helix. Thus, a cholesteric liquid crystal having an intrinsic helical structure which is left-handed in sense will transmit LHCPL and one having a helical structure which is right-handed in sense will transmit RHCPL.

Hereinafter these cholesteric liquid crystal substances will be identified in order to conform with popular convention, by the kind of light which is reflected at $\lambda_o$. When a film is said to be right-handed, it is meant that it reflects RHCPL, and when a film is said to be left-handed, it is meant that it reflects LHCPL.

A right-handed cholesteric liquid crystal substance transmits LHCPL essentially completely at $\lambda_o$ whereas the same substance reflects almost completely RHCPL. Conversely a left-handed film is almost transparent to RHCPL at $\lambda_o$ and reflects LHCPL. Since plane polarized or unpolarized light contain equal amounts of RHCPL and LHCPL, a cholesteric liquid crystal film is approximately 50 percent transmitting at $\lambda_o$ for these sources when the liquid crystal is in its Grandjean texture.

A further unique optical property of optically negative liquid crystal films is that contrary to the normal situation when light is reflected, such as by a mirror, where the sense of the circular polarization of the reflected light is reversed, this same phenomenon does not occur with light reflected by these liquid crystal films. The sense of the circular polarization of light reflected from these liquid crystal substances is not reversed but rather remains the same as it was before it came into contact with the liquid crystal substance. For example, if RHCPL having a wavelength $\lambda_o$ is directed at a right-hand film having $\lambda_o = 2np$ it is substantially completely reflected and, after reflection, remains RHCPL. If the same light were to be directed on a mirror the reflected light would be LHCPL.

Because of these optical properties optically negative liquid crystalline substances have been found to be highly advantageous for use in a number of applications. Copending patent applications Ser. No. 104,367 now U.S. Pat. No. 3,669,525 and Ser. No. 104,369 now U.S. Pat. No. 3,679,290, both filed Jan. 6, 1971 disclose the use of such liquid crystalline materials in optical filter systems. Copending patent application Ser. No. 104,344, filed Jan. 6, 1971, discloses the use of these materials in a detection system which can identify physical surface and/or electrical conductivity irregularities in a surface of interest.

One difficulty with respect to potential uses of cholesteric liquid crystalline materials in electro-optic devices has been the relatively high temperatures at which the majority of the known cholesteric materials become mesomorphic. Typically, electro-optic devices are operated at or near room temperature. Thus devices utilizing cholesteric liquid crystalline materials having relatively high mesomorphic temperature ranges would require additional apparatus to maintain the temperature of the liquid crystalline materials within their mesomorphic range thereby undesirably complicating the overall device configuration. Therefore there exists a continuing need for cholesteric liquid crystalline materials which have mesomorphic temperature ranges at or near room temperature.

SUMMARY OF THE INVENTION

It is therefore an object of this invention to provide liquid crystalline materials having the above-described desirable features.

It is another object of the invention to provide novel liquid crystalline compositions.

It is a further object of the invention to provide liquid crystalline compositions having cholesteric mesomorphic temperature ranges which are significantly larger than those of the individual components thereof.

It is a still further object of the invention to provide liquid crystalline compositions which have a cholesteric mesophase at or near room temperature.

Yet another object of the invention is to provide such liquid crystalline compositions which are useful in electro-optical applications.

A still further object of the invention is to provide such liquid crystalline compositions which may be utilized in electro-optic imaging and display devices.

These and other objects and advantages of the invention are accomplished by providing novel optically negative liquid crystalline compositions which are formed by mixing together cholesteric liquid crystalline materials with particular combinations of liquid crystalline compounds having a general formula and which have a nematic mesophase which is stable at relatively low temperatures. Liquid crystalline compounds which belong to the class of compounds having the general formula and wherein $R_1$ and $R_2$ are particular combinations of alkyl groups are disclosed in copending application Ser. No. 179,732 filed Sept. 13, 1971 on the same day as the present application. The novel compounds disclosed in the copending application are listed in Table I.

TABLE I

| $R_1$ | $R_2$ | Smectic (° C.) | Nematic (° C.) | Name |
|---|---|---|---|---|
| $C_3H_7$ | $C_4H_9$ | | 39–59 | p-n-Propoxybenzylidene-p'-n-butylaniline. |
| $C_4H_9$ | $C_4H_9$ | 7–46 | 46–75 | p-n-Butoxybenzylidene-p'-n-butylaniline. |
| $C_5H_{11}$ | $C_4H_9$ | 24–54 | 54–71 | p-n-Pentyloxybenzylidene-p'-butylaniline. |
| $C_6H_{13}$ | $C_4H_9$ | 25–70 | 70–78 | p-n-Hexyloxybenzylidene-p'-n-butylaniline. |
| $C_7H_{15}$ | $C_4H_9$ | 29–76 | 76–77.5 | p-n-Heptyloxybenzylidene-p'-n-butylaniline. |
| $C_4H_9$ | $CH_3$ | *(49)–66 | 66–68 | p-n-Butoxybenzylidene-p'-toluidine. |
| $C_4H_9$ | $C_2H_5$ | 42–52 | 52–67 | p-n-Butoxybenzylidene-p'-ethylaniline. |
| $C_5H_{11}$ | $CH_3$ | 35–45 | 45–64 | p-n-Pentyloxybenzylidene-p'-toluidine |

*Denotes monotropic transition.

It has also been found that by utilizing some of the compounds listed in Table I and other members of the same generic class it is possible to form compositions which have significantly larger nematic mesomorphic temperature ranges than those of the individual compounds. These novel nematic liquid crystalline compositions are disclosed in copending application Ser. NO. 179,731 filed Sept. 13, 1971 on the same day as the present application. The novel liquid crystalline compositions described in the copending application are: mixtures of p-methoxybenzylidene-p'-n-butylaniline ($R_1=CH_3$ and $R_2=C_4H_9$) (hereinafter referred to as ABUTA for simplicity) and p-n-butoxybenzylidene-p'-n-butylaniline (hereafter BOBUTA); mixtures of p-ethoxybenzylidene-p'-n-butylaniline ($R_1=C_2H_5$ and $R_2=C_4H_9$) (hereafter EOBUTA) and ABUTA; mixtures of EOBUTA and BOBUTA; mixtures of p-n-butoxybenzylidene p'-ethylaniline (hereinafter BOETHA) and ABUTA; mixtures of BOETHA and EOBUTA; mixtures of p-n-pentyloxybenzylidene-p'-n-butylaniline (hereinafter PENTOBUTA) and ABUTA; and mixtures of p-n-hexyloxybenzylidene-p'-n-butylaniline (hereinafter HEXOBUTA) and ABUTA. These compositions typically have nematic mesomorphic temperature ranges which are stable at room temperature or slightly below and in some cases significantly below, typically extending to below 0°C.

Now it has been surprisingly found that optically negative liquid crystalline compositions which have a cholesteric mesophase at, near or below room temperature can be formed by mixing together a suitable cholesteric liquid crystalline substance, or mixture of these substances, with the compositions listed above. In other words, each of the nematogenic compositions previously described can be mixed together with a sufficient amount of any suitable cholesteric liquid crystalline material, or combination thereof, to form liquid crystalline compositions which have optically negative characteristics. The optically negative compositions of the invention have a cholesteric mesomorphic temperature range which is significantly larger than those of the individual components thereof.

The invention will be more readily understood from the following detailed description of preferred embodiments thereof particularly when read in conjunction with the accompanying drawings wherein.

Generally speaking, the individual nematogenic compounds employed in the optically negative liquid crystalline compositions of the invention are prepared by condensation in refluxing ethanol of the respective p-n-alkoxybenzaldehyde and the appropriate p-n-alkylaniline. Refluxing is carried out for several hours and the solvent is then removed by distillation. The crystalline products are then purified by repeated crystallization from an appropriate solvent such as methanol or petroleum ether. For a detailed description of the procedures used in forming these compounds see copending application Ser. No. 179,732, filed Sept. 13, 1971 on the same day as the present application.

The nematogenic compositions are prepared by weighing appropriate fractions of the desired constituents, combining them in a vessel, e.g., a glass beaker, and heating above the isotropic transition temperatures of the respective constituents with mixing to ensure a homogeneous composition. FIGS. 1–7 illustrate the eutectic behavior of the respective nematogenic compositions utilized to form the optically negative compositions of the invention. The temperatures at which transitions from the nematic mesomorphic state to the isotropic state occur, as indicated in FIGS. 1–7 for the respective compositions, are determined by differential thermal analysis employing a duPont 900 Differential Thermal Analyzer equipped with chromel alumel thermocouples. The thermograms are obtained at a heating rate of 10°C/minute and the temperature at the beginning of the state transition endotherm is taken as the characteristic temperature. The temperature is determined by linear extrapolation of the leading edge of the endotherm to its intersection with the baseline. Verification of the state assignments is obtained by polarized optical microscopy. Samples of the compositions are placed, in the form of thin films, between glass cover slides and viewed through a Leitz Ortholux polarizing microscope having a calibrated hot stage. Visually observed changes have been found to coincide within 2°C with the phase transitions observed by thermal analysis.

Figure 1:
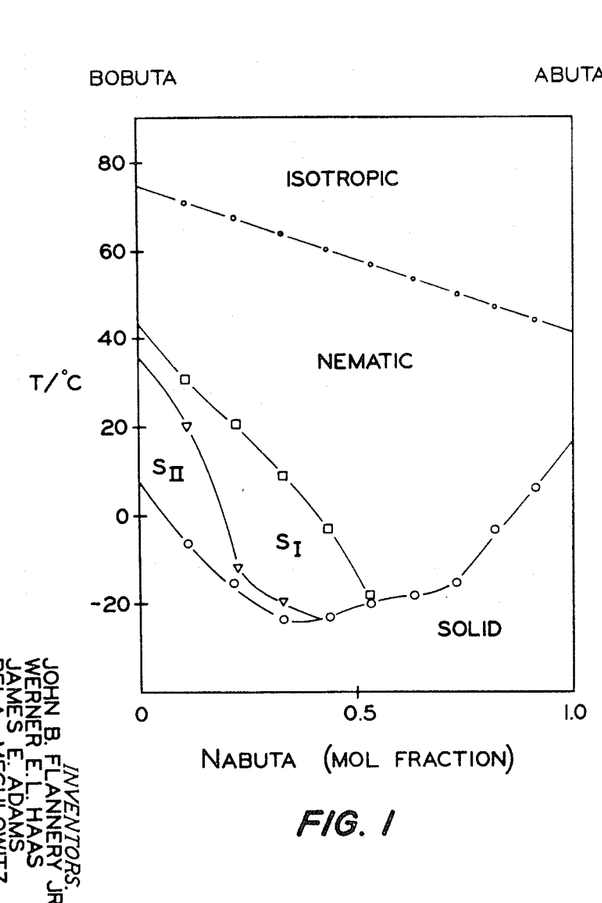
FIGS. 1–7 are graphical plots illustrating the eutectic behavior of the respective nematogenic compositions to form the optically negative compositions of the invention.
Figure 2:
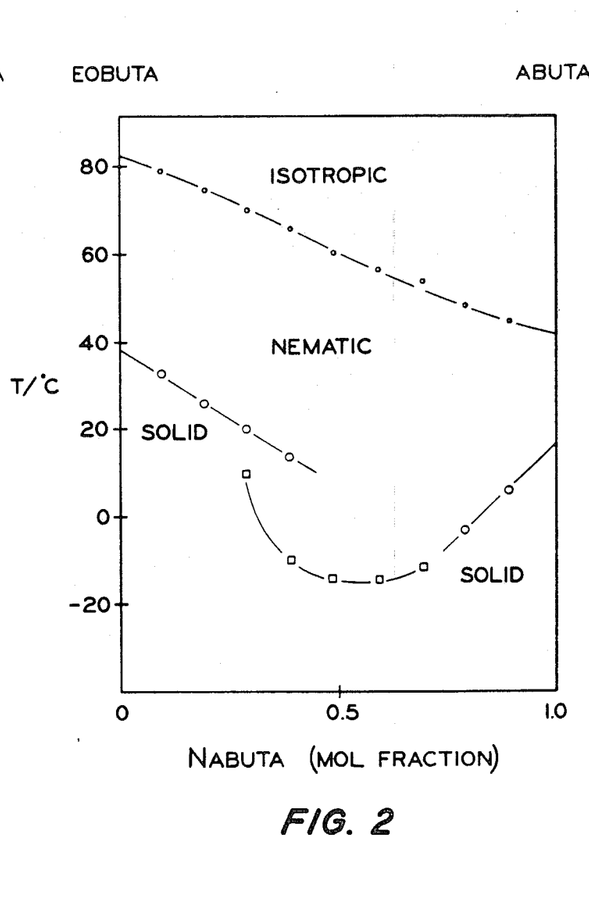
Figure 3:
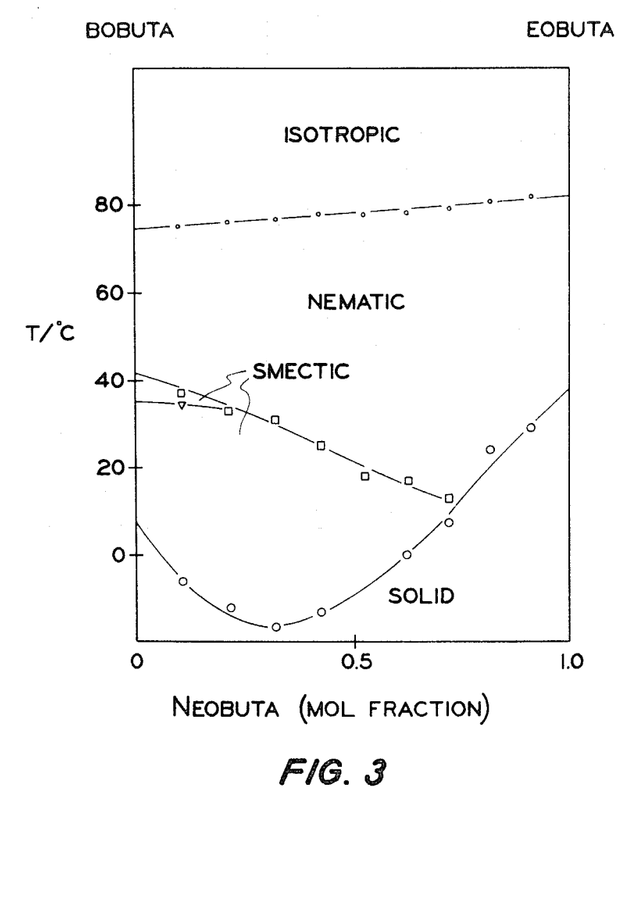
Figure 4:
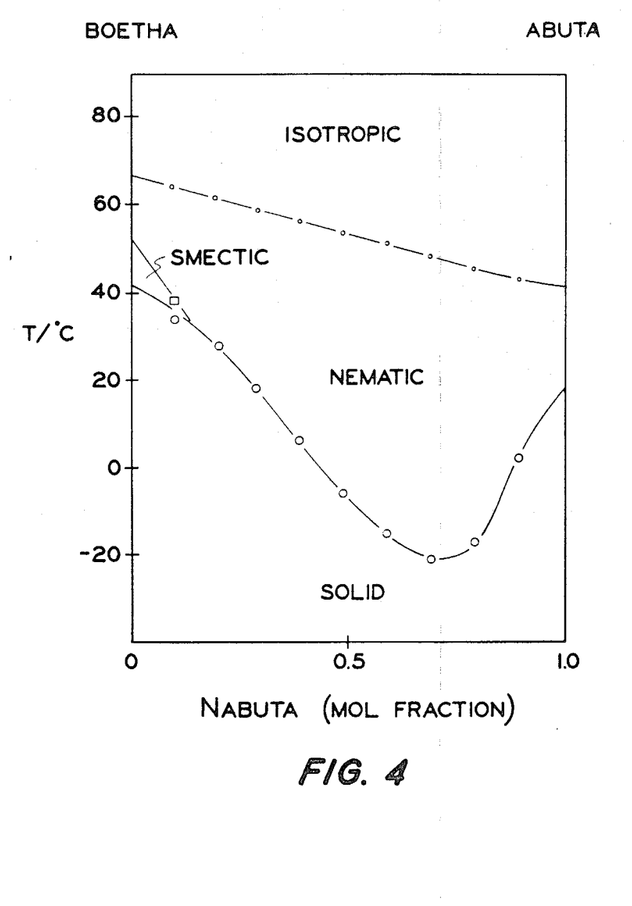
Figure 5:
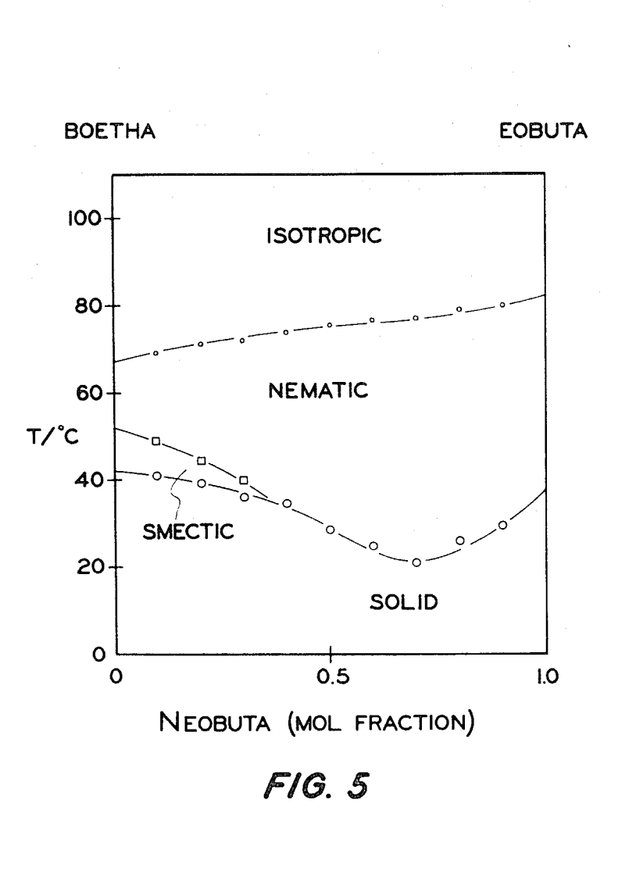
Figure 6:
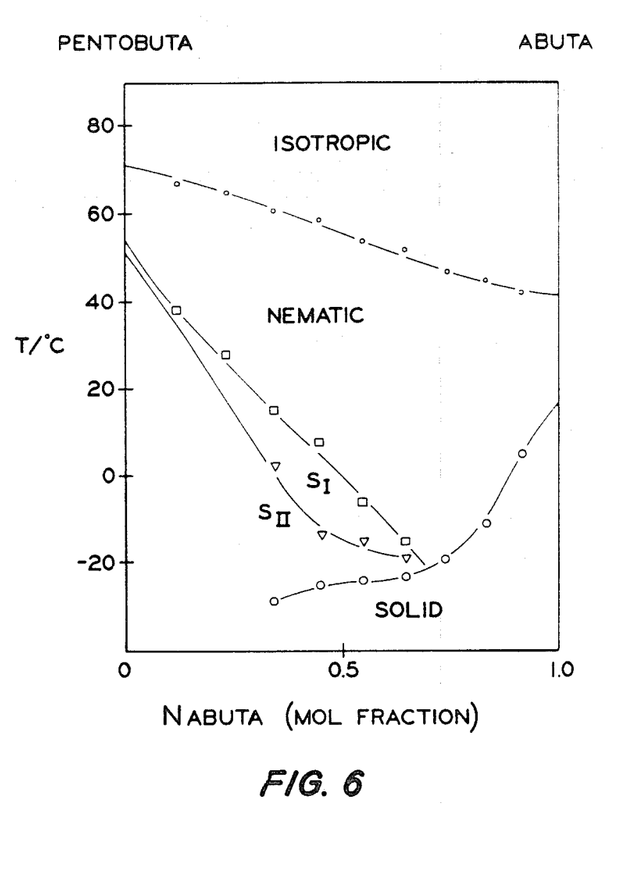
Figure 7:
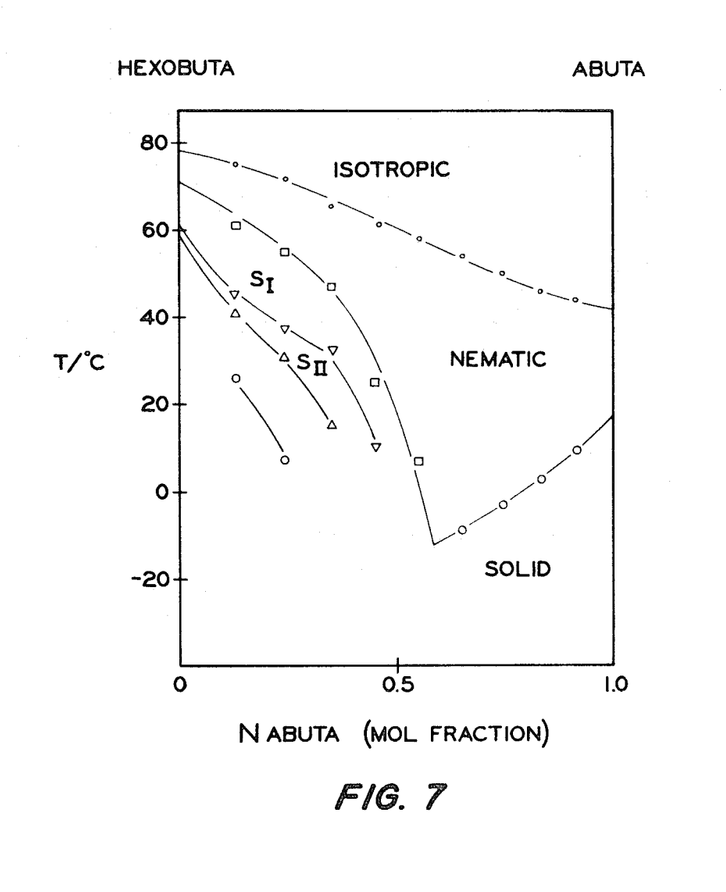
Figure 8:
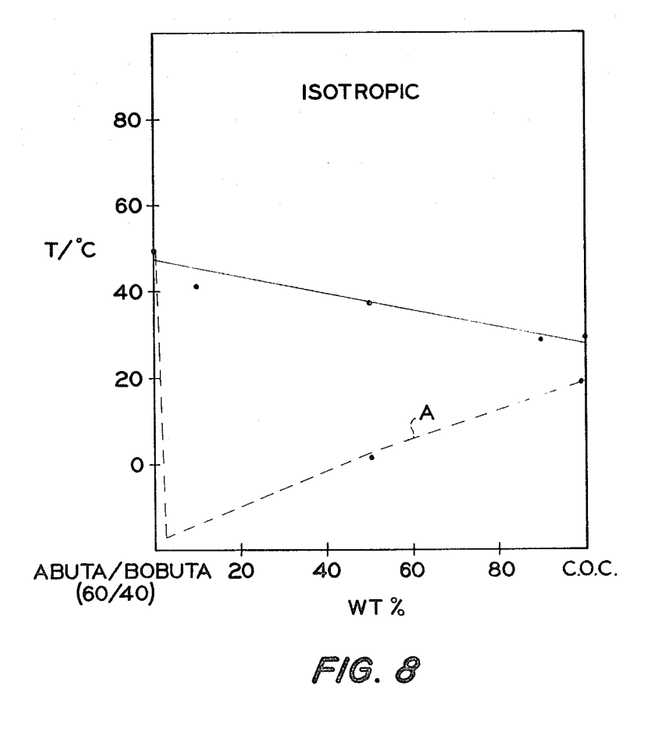
FIG. 8 graphically illustrates the liquid crystalline mesomorphic temperature characteristics of typical optically negative compositions of the invention.

The optically negative compositions of the invention are formed by mixing each of the nematogenic compositions described above with any suitable cholesteric liquid crystalline material or mixture of cholesteric liquid crystalline materials. Of course it will be understood that the amount of the cholesteric component must be sufficient to provide optically negative characteristics to the overall compositions. Generally speaking the optically negative liquid crystalline compositions of the invention comprise from about 5 percent to about 99 percent by weight of the cholesteric liquid crystalline component and from about 1 percent to about 95 percent by weight of the nematogenic liquid crystalline composition. FIG. 8 illustrates the cholesteric mesomorphic liquid crystalline characteristics of a typical composition of the invention. Referring now to FIG. 8 there is seen a graphical plot showing the cholesteric mesomorphic temperature characteristics of compositions formed from varying weight percentages cholesteryl oleyl carbonate (a cholesteric liquid crystalline substance) and a 60/40 per cent by mixture of ABUTA and BOBUTA. Various mixtures of the two components are made and their isotropic transition temperatures, i.e. the temperature at which they become a true liquid, are determined. These isotropic transition temperatures are plotted in FIG. 8. All of the compositions are observed to have a cholesteric liquid crystalline mesophase at room temperature. Moreover at a concentration of 50 percent by weight of the cholesteryl oleyl carbonate, the composition is observed to have a smectic to cholesteric phase transition temperature of about 1°C. Since cholesteryl oleyl carbonate has a cholesteric mesomorphic temperature range of from about 20°C to about 29°C, then by interpolation the dotted line A, can be drawn to give an approximation of the cholesteric phase temperature ranges for the system shown.

Figure 9:
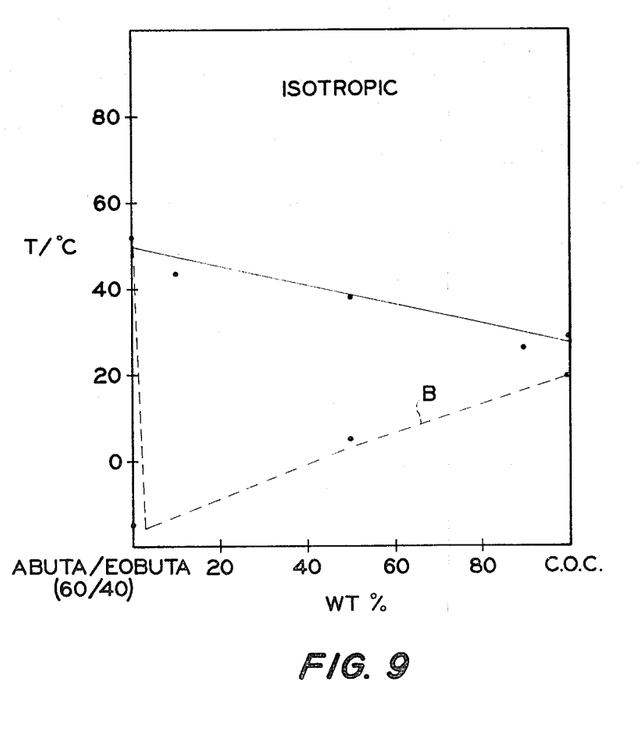
FIG. 9 graphically illustrates the liquid crystalline mesomorphic temperature characteristics of other typical optically negative compositions of the invention.

FIG. 9 illustrates another typical composition of the invention. Referring now to FIG. 9 there is seen a graphical plot showing the cholesteric mesomorphic temperature characteristics of compositions formed from varying weight percentages of cholesteryl oleyl carbonate and a 60/40 percent by weight mixture of ABUTA and EOBUTA. Again, as above, various mixtures of the two components are made and their isotropic transition temperatures determined. The isotropic transition temperatures are plotted in FIG. 9. All of the compositions are observed to have a cholesteric liquid crystalline mesophase at room temperature. At a composition of 50 percent by weight of cholesteryl oleyl carbonate the composition is observed to have a smectic to cholesteric phase transition temperature of about 5°C. Again using the lower limit of the cholesteric mesomorphic temperature range it is possible to interpolate to obtain an approximation of the cholesteric phase temperature ranges for the system shown. Dotted line B indicates the approximate lower limit of the cholesteric temperature range for the system.

Of course it will be understood that the systems shown in FIGS. 8 and 9 are intended to be exemplary since, as was stated previously, any suitable cholesteric liquid crystalline material may be combined with the nematic mixtures specified and typically form optically negative compositions having extended mesomorphic temperature ranges. Typical suitable cholesteric liquid crystalline materials include, for example, derivatives from reactions of cholesterol and inorganic acids, for example, cholesteryl chloride, cholesteryl bromide, cholesteryl iodide, cholesteryl nitrate; esters derived from reactions of cholesterol and carboxylic acids; for example cholesteryl crotonate; cholesteryl nonanoate; cholesteryl hexanoate; cholesteryl formate; cholesteryl docosonoate; cholesteryl chloroformate; cholesteryl propionate; cholesteryl acetate; cholesteryl valerate; cholesteryl vacconate; cholesteryl linolate; cholesteryl linolenate; cholesteryl oleate; cholesteryl erucate; cholesteryl butyrate; cholesteryl caprate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl heptyl carbamate; and alkyl amides and aliphatic secondary amines derived from 3 $\beta$-amino- $\Delta^5$-cholestene and mixtures thereof; peptides such as poly- $\gamma$-benzyl- $l$-glutamate; derivatives of beta sitosterol such as sitosteryl chloride; and active amyl ester of cyano benzylidene amino cinnamate. The alkyl groups in said compounds are typically saturated or unsaturated fatty acids, or alcohols, having less than about 25 carbon atoms, and unsaturated chains of less than about five double-bonded olefinic groups. Aryl groups in the above compounds typically comprise simply substituted benzene ring compounds. Any of the above compounds and mixtures thereof may be suitable for cholesteric liquid crystalline compositions in the present invention. The novel cholesteric liquid crystalline compositions of the present invention may be advantageously employed in various electro-optic applications such as imaging and display devices. Copending patent application Ser. No. 821,565, filed May 5, 1969 now U.S. Pat. No. 3,652,148 and hereby incorporated herein by reference discloses a system wherein an optically negative liquid crystalline substance is transformed to an optically positive liquid crystalline mesophase by an applied electric field. Copending patent application Ser. No. 867,593, filed Oct. 20, 1969 now U.S. Pat. No. 3,642,348 and hereby incorporated by reference herein discloses a system which transforms a cholesteric liquid crystalline material from its Grandjean or "disturbed" texture state to its focal-conic or "undisturbed" texture state by an applied electric field.

Figure 10:
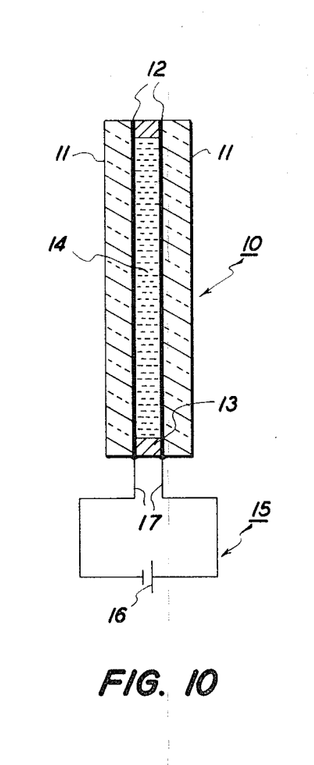
FIG. 10 is a partially schematic cross-sectional view of a liquid crystalline imaging member.

In FIG. 10 a typical liquid crystalline imaging member 10, sometimes referred to as an electroded imaging sandwich, is shown in partially schematic cross-section where a pair of transparent plates 11 having substantially transparent conductive coating 12 upon the contact surface, comprise a parallel pair of substantially transparent electrodes. An imaging member wherein both electrodes are transparent is preferred where the imaging member is to be viewed using transmitted light; however, a liquid crystalline imaging member may also be viewed using reflected light thereby requiring only a single transparent electrode while the other may be opaque. The transparent electrodes are separated by spacing member 13 which contains voids which form one or more shallow cups which contain the liquid crystalline film or layer which comprises the active element of the imaging member. A field is created between the electrodes by an external circuit 15 which typically comprises a source of potential 16 which is connected across the two electrodes through leads 17. The circuit 15 may also contain suitable switching means. The potential source may be either D.C., A.C., or a combination thereof.

According to the system described in copending application Ser. No. 867,593, when cholesteric liquid crystals or a mixture of cholesteric liquid crystalline substances is used in an electrode sandwich such as described in FIG. 10, electric fields applied across the liquid crystalline film cause an electrical field-induced texture transition to occur wherein a cholesteric liquid crystalline material initially in its Grandjean or "disturbed" texture is transformed to its focal-conic or "undisturbed" texture. The Grandjean texture is typically characterized by selective dispersion of incident light around a wavelength $\lambda_o$ (where $\lambda_o = 2np$ where $n$ = the index of refraction of the liquid crystalline film and $p$ = the pitch of the liquid crystalline film) and optical activity for wavelengths of incident light away from $\lambda_o$. If $\lambda_o$ is in the visible spectrum, the liquid crystalline film appears to have the color corresponding to $\lambda_o$, and if $\lambda_o$ is outside the visible spectrum the film appears colorless and non-scattering. The Grandjean texture of cholesteric liquid crystals is sometimes referred to as the "disturbed" texture.

The focal-conic texture is also typically characterized by selective dispersion but in addition this texture also exhibits diffuse scattering in the visible spectrum, whether $\lambda_o$ is in the visible spectrum or not. The appearance of the focal-conic texture state is typically milky-white when $\lambda_o$ is outside the visible spectrum. The focal-conic texture of cholesteric liquid crystals is sometimes referred to as the "undisturbed" texture.

For example, in this system when cholesteric liquid crystals are placed in the unbiased electrode sandwich, they initially appear colored, or colorless and transparent. If the electrode sandwich is observed between polarizers the imaging sandwich appears colored or black. When the electrical field is placed across the liquid crystalline film, the field-induced texture change is observable because the liquid crystalline film becomes white in the imaged area when the imaging sandwich is observed in transmitted or reflected light. The described imaging system thereby produces a white image on a dark or colored background. However, it is clear that either field or non-field areas in the liquid crystalline imaging sandwich may be used to create the desired image, with or without the use of polarizers or other image enhancing devices.

The system described in copending application Ser. No. 821,565, filed May 5, 1969 now U.S. Pat. No. 3,652,148 is similar to that just described but typically uses higher voltages and field strengths, (relative to those used in the system of application 827,593) to transform an optically negative liquid crystalline substance to an optically positive liquid crystalline mesophase. However the respective processes produce entirely different effects as will be appreciated by those skilled in the art.

In the liquid crystal imaging member described in FIG. 10 the electrodes may be of any suitable transparent conductive material. Typical suitable transparent, conductive electrodes include glass or plastic substrates having substantially transparent and continuously conductive coatings of conductors such as tin, indium oxide, aluminum, chromium, tin oxide, or any other suitable conductor. These substantially transparent conductive coatings are typically evaporated onto the more insulating, transparent substrate. NESA glass, a tin oxide coated glass manufactured by the Pittsburgh Plate Glass Co., is a commercially available example of a typical transparent, conductive electrode material.

The spacer, 13 in FIG. 10, which separates the transparent electrodes and contains the liquid crystal film between said electrodes, is typically chemically inert, transparent, substantially insulating and has appropriate dielectric characteristics. Materials suitable for use as insulating spacers include cellulose acetate, cellulose triacetate, cellulose acetate butyrate, polyurethane elastomers, polyethylene, polyproylene, polyesters, polystyrene, polycarbonates, polyvinylfluoride, polytetrafluoroethylene, polyethylene terephthalate, and mixtures thereof.

Such spacers, which also approximately define the thickness of the imaging layer or film of liquid crystals, are preferably of a thickness in the range of about 10 mils or less. Optimum results are typically attained with spacers in the thickness range between about ¼ mil and about 5 mils.

It will be further recognized that the devices used in the imaging systems just described may be modified. For example, at least one of the electrodes shown in FIG. 10 may be provided in image configuration thereby providing a system where the desired image is defined by the shape of one of the electrodes, or the desired image may be defined by the shape of the spacing member; or at least one of the electrodes may also be a photoconductor and an imagewise field may be applied across the cholesteric liquid crystalline film by means of an imagewise pattern of activating radiation being directed upon the imaging cell while a potential is applied to the electrodes.

The novel cholesteric liquid crystalline compositions of the invention will now be further described with respect to specific preferred embodiments by way of Examples it being understood that these are intended to be illustrative only and the invention is not limited to the materials, proportions, etc. recited therein. All parts and percentages listed are by weight unless otherwise specified.

EXAMPLES

All of the compositions listed in the following Examples are prepared by placing the contituents in a vessel, heating above the isotropic transition temperatures of the constituents with mixing to ensure a homogeneous composition. The isotropic transition temperatures are determined by differential thermal analysis.

EXAMPLE I

A cholesteric liquid crystalline composition is prepared from 10 percent cholesteryl erucate, 54 percent ABUTA and 36 percent BOBUTA. The composition is cholesteric at room temperature and has an isotropic transition temperature of about 44°C.

EXAMPLE II

A cholesteric liquid crystalline composition is prepared from 20 percent cholesteryl erucate, 48 percent ABUTA and 32 percent BOBUTA. The composition is cholesteric at room temperature and has an isotropic transition temperature of about 44°C.

EXAMPLE III

A cholesteric liquid crystalline composition is prepared from 90 percent cholesteryl erucate, 6 percent ABUTA and 4 percent BOBUTA. The composition has an isotropic transition temperature of about 43°C.

EXAMPLE IV

A cholesteric liquid crystalline composition is prepared from 10 percent cholesteryl erucate, 54 percent ABUTA and 36 percent EOBUTA. The composition is cholesteric at room temperature and has an isotropic transition temperature of about 46°C.

EXAMPLE V

A cholesteric liquid crystalline composition is prepared from 20 percent cholesteryl erucate, 48 percent ABUTA and 32 percent EOBUTA. The composition is cholesteric at room temperature and has an isotropic transition temperature of about 46°C.

EXAMPLE VI

A cholesteric liquid crystalline composition is prepared from 90 percent cholesteryl erucate, 6 percent ABUTA and 4 percent EOBUTA. The composition has an isotropic transition temperature of about 42°C.

EXAMPLES VII – XX

The compositions are formed with the listed percentages of the individual constituents. All of the compositions are cholesteric at room temperature. The approximate transition temperatures are shown

| EXAMPLE | | Smectic → Chol Transition (°C) | Chol → Isotropic Transition (°C) |
|---|---|---|---|
| VII | 50 % cholesteryl oleyl carbonate 35% ABUTA 15% BOETHA | 4 | 37 |
| VIII | 50% cholesteryl oleyl carbonate 40% EOBUTA 10% BOETHA | — | 50 |
| IX | 50% cholesteryl oleyl carbonate 30% ABUTA 20% PENTOBUTA | 0 | 39 |
| X | 50% cholesteryl oleyl carbonate 30% ABUTA 20% HEXOBUTA | 0 | 41 |
| XI | 50% cholesteryl oleyl carbonate 30% ABUTA 20% BOBUTA | 1 | 37 |
| XII | 50% cholesteryl oleyl carbonate 30% ABUTA 20% EOBUTA | 5 | 38 |
| XIII | 50% cholesteryl oleyl carbonate 30% EOBUTA 20% BOBUTA | — | 52 |
| XIV | 20% cholesteryl erucate 64% EOBUTA 16% BOETHA | 3 | 66 |
| XV | 20% cholesteryl erucate 48% ABUTA 32% PENTOBUTA | −29 | 48 |
| XVI | °% cholesteryl erucate 48% ABUTA 32% HEXOBUTA | −40 | 52 |
| XVII | 20% cholesteryl erucate 48% ABUTA 32% BOBUTA | — | 44 |
| XVIII | 20% cholesteryl erucate 48% ABUTA 32% EOBUTA | — | 46 |
| XIX | 20% cholesteryl erucate 48% EOBUTA 32% BOBUTA | 2 | 68 |
| XX | 20% cholesteryl erucate 56% ABUTA 24% BOETHA | — | 44 |

While the invention has been described with respect to various preferred embodiments thereof it is not intended to be limited thereto but rather variations and modifications will be apparent to those skilled in the art which are within the spirit of the invention and the scope of the claims.

What is claimed is:

1. Liquid crystalline compositions having a cholesteric mesophase comprising from about 5 to about 99 weight percent of a cholesteric liquid crystalline material and from about 1 to about 95 weight percent of a nematic liquid crystalline composition comprising from about 55 to about 65 weight percent of and from about 35 to about 45 weight percent of 2. An imaging process comprising providing a layer of an imaging material comprising a composition of claim 1 and
 providing an imagewise electrical field across said layer while said composition is in the cholesteric liquid crystalline phase to cause an imagewise change in the appearance of image portions of said imaging material layer while the background portions of said material layer retain an appearance substantially distinguishable from the image portions of said layer.

3. The process as defined in claim 2 wherein a pair of conductive electrode members are provided in spaced relationship, at least one of said electrodes being at least partially transparent,
 placing said imaging material layer between said members and
 applying an electrical field between said members while said composition is in the cholesteric liquid crystalline phase to cause a change in the appearance of said composition in an imagewise configuration.

4. The process as defined in claim 3 wherein at least one of said electrodes is shaped in image configuration.

5. The process as defined in claim 3 wherein at least one of said electrodes includes a photoconductive surface and said imagewise electrical field is applied across said imaging material layer by exposing said photoconductive surface to an imagewise pattern of activating radiation while applying a potential to said electrodes.

6. The method of producing a display comprising
 providing a display device comprising first and second spaced plates, at least one of which is substantially transparent, a plurality of parallel electrically conductive films on one face of said first plate, a plurality of parallel electrically conductive films on one face of said second plate, the plurality of films on at least one plate being substantially transparent, said two plates being positioned with faces bearing said parallel conductive films adjacent and parallel to each other and the direction of said conductive films on one plate being perpendicular to the direction of said conductive films on the other plate, and a liquid crystalline material comprising a composition of claim 1 filling the space between said plates and
 selectively energizing at least one conductive film on each plate while said composition is in the cholesteric liquid crystalline phase to cause an electric field to be selectively applied across said liquid crystalline material whereby an image is observed.

7. Liquid crystalline compositions having a cholesteric mesophase comprising from about 5 to about 99 weight percent of a cholesteric liquid crystalline material and from about 1 to about 95 weight percent of a nematic liquid crystalline composition comprising from about 50 to about 70 weight percent of and from about 30 to about 50 weight percent of

8. Liquid crystalline compositions having a cholesteric mesophase comprising from about 5 to about 99 weight percent of a cholesteric liquid crystalline material and from about 1 to about 95 weight percent of a nematic liquid crystalline composition comprising from about 60 to about 80 weight percent of and from about 20 to about 40 weight percent of

9. Liquid crystalline compositions having a cholesteric mesophase comprising from about 5 to about 99 weight percent of a cholesteric liquid crystalline material and from about 1 to about 95 weight percent of a nematic liquid crystalline composition comprising from about 50 to about 80 weight percent of and from about 20 to about 50 weight percent of

10. Liquid crystalline compositions having a cholesteric mesophase comprising from about 5 to about 99 weight percent of a cholesteric liquid crystalline material and from about 1 to about 95 weight percent of a nematic liquid crystalline composition comprising from about 50 to about 70 weight percent of and from about 30 to about 50 weight percent of

* * * * *